(12) United States Patent
Rotem

(10) Patent No.: US 7,069,189 B2
(45) Date of Patent: Jun. 27, 2006

(54) METHOD AND APPARATUS FOR CONTROLLING MULTIPLE RESOURCES USING THERMAL RELATED PARAMETERS

(75) Inventor: Efraim Rotem, Haifa (IL)

(73) Assignee: Intel Corporation, Santa Clara, CA (US)

( * ) Notice: Subject to any disclaimer, the term of this patent is extended or adjusted under 35 U.S.C. 154(b) by 253 days.

(21) Appl. No.: 10/331,610

(22) Filed: Dec. 31, 2002

(65) Prior Publication Data

US 2004/0128100 A1 Jul. 1, 2004

(51) Int. Cl.
*G06F 15/00* (2006.01)

(52) U.S. Cl. .................. 702/189; 702/136; 702/127; 702/116; 702/104; 713/300; 713/320; 700/299; 700/300; 717/161; 717/148; 717/121

(58) Field of Classification Search .............. 702/104, 702/116, 127–136, 188–189; 713/300, 320; 700/299, 300; 717/161, 121
See application file for complete search history.

(56) References Cited

U.S. PATENT DOCUMENTS

| 4,954,945 A | 9/1990 | Inoue |
| 5,870,614 A | 2/1999 | Ang |
| 6,501,999 B1 | 12/2002 | Cai |
| 6,535,798 B1 * | 3/2003 | Bhatia et al. ............ 700/293 |
| 6,804,632 B1 | 10/2004 | Orenstien et al. |
| 2003/0110012 A1 | 6/2003 | Orenstein et al. |
| 2003/0135771 A1 * | 7/2003 | Cupps et al. ............ 713/320 |
| 2003/0217297 A1 | 11/2003 | Gschwind et al. |

FOREIGN PATENT DOCUMENTS

JP    08016531    1/1996

OTHER PUBLICATIONS

Lundquist et al., 'Micro–processor–Based Adaptive Thermal Control for an Air–Cooled Computer CPU Module', Mar. 2001, 17th IEEE Semi–Therm Symposium, pp.: 168–173.*
Gaudiot et al., 'Computer Systems and Architecture', Jan. 2002, Part II, CRC Press, pp. 1–66.*
U.S. Appl. No. 10/331,611, filed Dec. 31, 2002, Rotem.

* cited by examiner

*Primary Examiner*—Marc S. Hoff
*Assistant Examiner*—Elias Desta
(74) *Attorney, Agent, or Firm*—Pearl Cohen Zedek Latzer LLP

(57) ABSTRACT

In some embodiments of the present invention, a method and system are provided in a multiple resource environment for relieving a thermal condition by applying cooling techniques or throttling to lower priority threads.

24 Claims, 3 Drawing Sheets

METHOD AND APPARATUS FOR CONTROLLING MULTIPLE RESOURCES USING THERMAL RELATED PARAMETERS

BACKGROUND OF THE INVENTION

High performance central processing units (CPUs) may integrate multiple processing capabilities, such as cores and/or resources, on a single die. It is desirable to improve the performance of systems using multiple-core CPUs.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
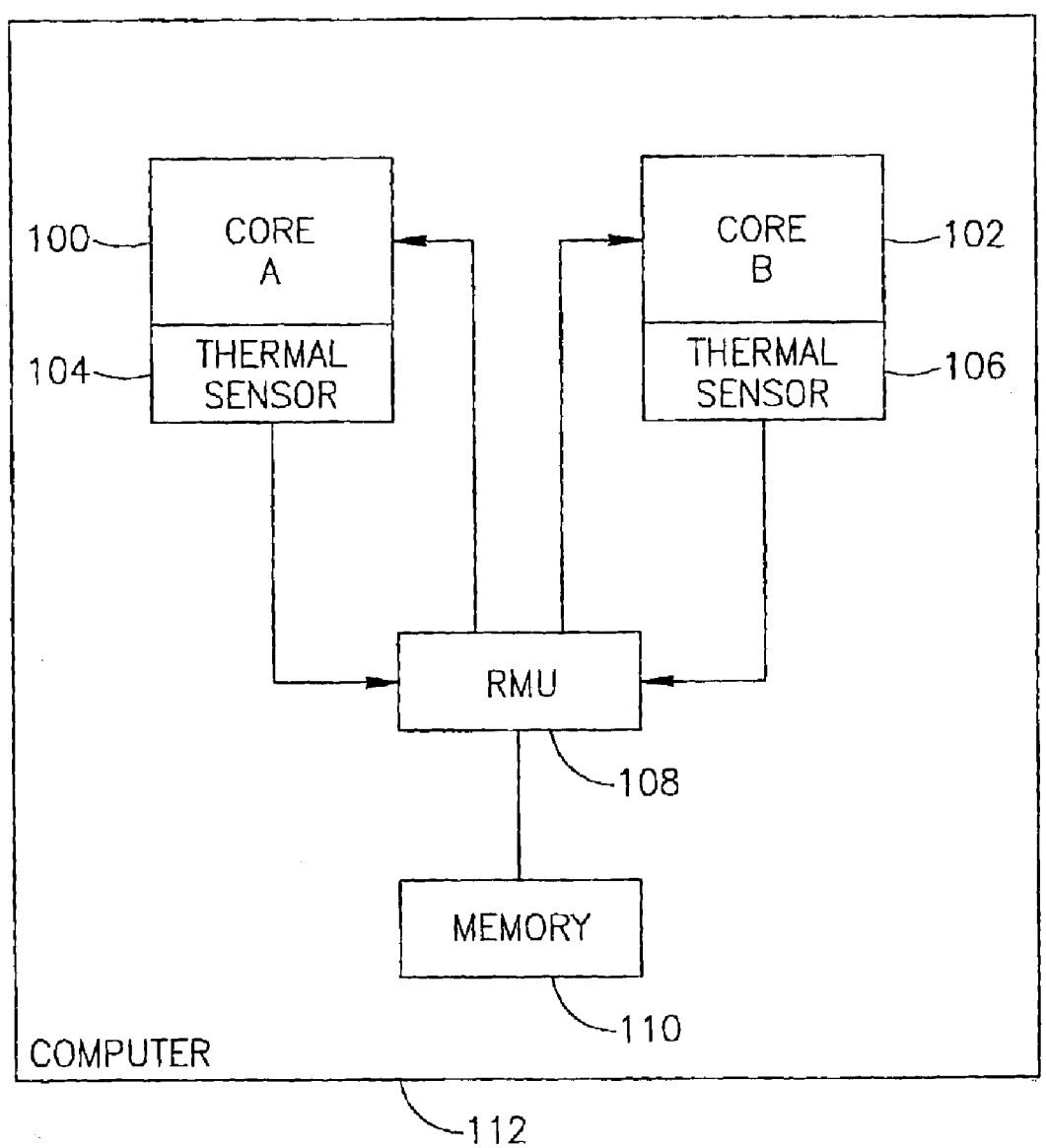
FIG. 1 is a schematic diagram of a multi-core CPU with thermal relief using thread-execution control in accordance with exemplary embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements. It will be appreciated that these figures present examples of embodiments of the present invention and are not intended to limit the scope of the invention.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

High performance central processing units (CPUs) may integrate multiple processing capabilities, i.e., cores and/or resources, on a single die, thereby thermally coupling the cores. Because the processing performance and/or frequency of the individual cores and resources may depend on temperature, the maximum frequency and performance that may be achieved by such integrated CPUs depends on the ability to extract heat from the cores and resources, e.g., using a shared heat sink and a given cooling technology. The cooling capability may also be limited by both the absolute power generated by the device and the power density distribution on the device. Furthermore, many modern operating systems and software have the capability to execute multiple software threads in parallel using more than one processing core.

When running multi-threaded software on a multiple-core CPU, the heat generated by one core may affect the performance of another core. Multiple cores that run simultaneously typically generate more heat than a single core and therefore may run at lower frequency and performance than a single core on the same CPU. Systems using such CPU combinations must generally be equipped to handle the worse-case condition. For example, in the absence of a mechanism to dynamically control the multi-threading power, the frequency must be set to a lower point, one that can accommodate the thermal demands of a multiple core. Therefore, the operation conditions of the system may be limited based on the multi-core condition. Mechanisms such as thermal throttling or mechanisms described in U.S. patent application Ser. No. 10/020,568, entitled "DISTRIBUTION OF PROCESSING ACTIVITY ACROSS PROCESSING HARDWARE BASED ON POWER CONSUMPTION CONSIDERATIONS", filed Dec. 6, 2001 and assigned to the assignee of this application, provide safety mechanisms. However, even these solutions, which may be adequate in some instances, may often result in reduced performance. Thus single thread operations may not fully utilize the maximum capabilities of the system.

Some embodiments of the invention provide a method and a system to reduce the overall thermal output of multiple-core CPUs and, thereby, to improve the performance characteristics of systems using multiple-core CPUs.

Multi-threaded applications may have an unbalanced load. At any given time, there may be one main thread that is critical to performance and additional threads that are less critical to performance. According to an aspect of embodiments of the present invention, in a thermally limited system, resources executing critical or high priority threads may be permitted to run using the CPU's fullest possible performance, while resources executing non-critical or low priority thread(s) may be throttled to provide thermal relief.

According to another aspect of embodiments of the present invention, the simultaneous operation of multiple execution resources may be managed to improve performance of a critical task by relief of power and thermal impacts of less critical tasks. Such resource management may improve CPU frequency and performance in a given thermal envelope. One result of embodiments of the present invention may be the improved overall performance of a multi-core CPU in a thermally constrained environment.

In one embodiment of the present invention, shown in FIG. 1, there may be provided in a computer 112 thermal sensors 104 and 106, respectively, that may monitor or measure the activity and/or thermal status of cores 100 and 102, respectively, of the CPU. It should be noted that as defined herein, a core need not be a full core, but rather may be any resource or execution or processing unit, for example, an integer or floating point decimal multiplier. The thermal sensor may be a power monitor unit, such as an internal diode that translates temperature to an electrical signal, e.g., a voltage, as used in Intel Corporation's Pentium 4 CPU. For example, the power monitor unit may be as described in U.S. patent application Ser. No. 10/020,568.

Typically, a power monitor may be provided for each of the cores or execution units providing feedback to a resource management unit ("RMU"). Resource management unit 108 may manage the operation of the resources in a thermally efficient manner. RMU 108 may include, for example, a central or distributed hardware unit on the CPU. Additionally or alternatively, the resource management unit 108 may include, for example, a software algorithm in the operating system.

Resource management unit 108 may, for example, be in communication with a memory 110, as shown in the embodiment in FIG. 1. Memory 110 may be, for example, dedicated to the resource management unit, or it may be for example a general purpose memory serving other functions of the CPU or any other memory.

Further, in some embodiments of the invention, the resource management unit 108 may include a mechanism to determine the priority of threads running on the cores, or the RMU may receive inputs relating to historical core activity or thread priority. In one embodiment of the invention, memory 110 may contain data relating to thread priority.

It should be noted that as used herein, the RMU may be a series of functions distributed between various software and/or hardware components, and need not be a single software program or hardware component.

It should further be noted that although FIG. 1 depicts two cores, those of skill in the art will recognize that the same principles of the present invention may be used to provide thermal relief for more than two cores.

Figure 2:
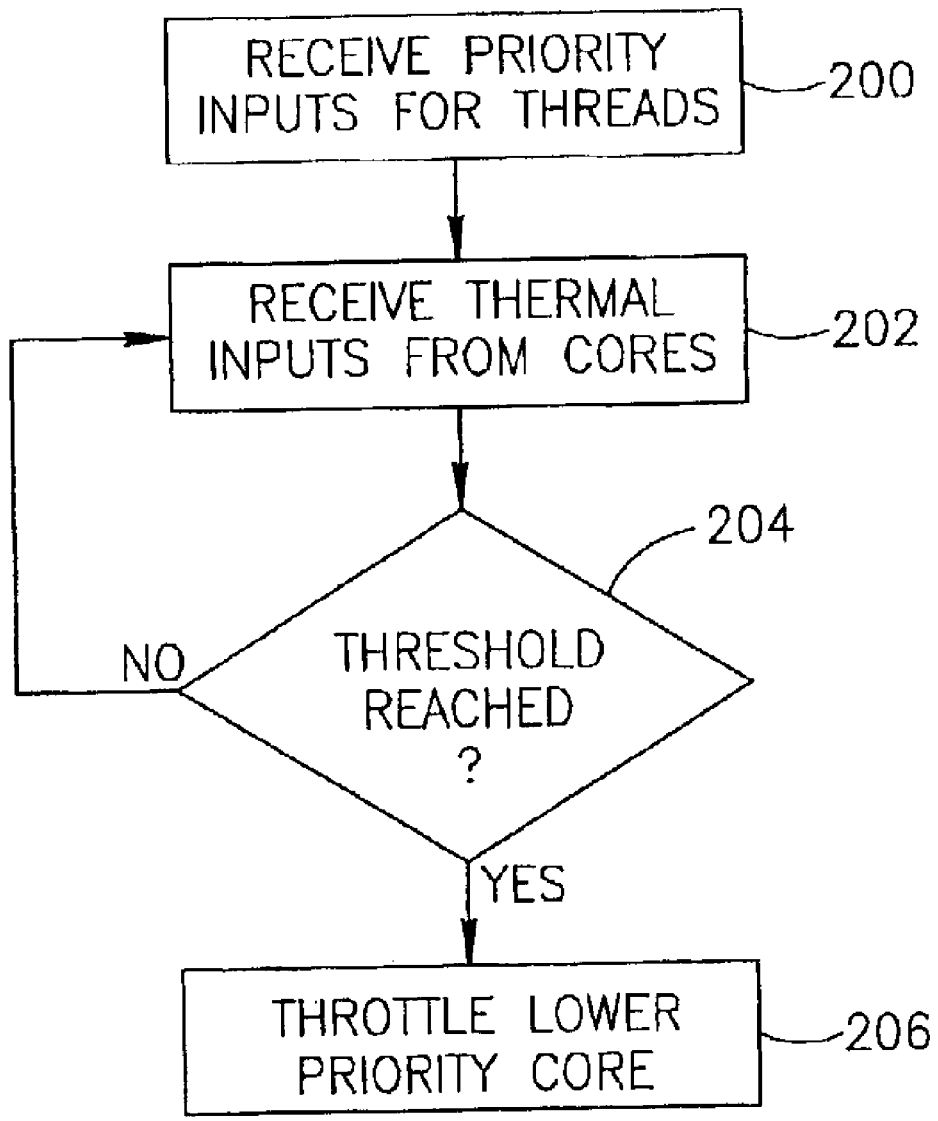
FIG. 2 is a flowchart of a method of thermally relieving a multi-core CPU using thread-execution control in accordance with one exemplary embodiment of the present invention.

A method in accordance with exemplary embodiments of one aspect of the present invention is shown schematically in FIG. 2. As shown at block 200, inputs may be received relating to the priority of threads being executed by multiple cores. It should be noted that in other embodiments of the present invention, the priority of threads may be determined differently, for example, the priorities may be deduced from the thermal activity of a certain core during a predefined processing period.

In yet further embodiments of the present invention, the history of high power usage in a thermally significant period of time for certain threads or types of threads may be recorded; thus, determining the priority of threads, which may control the throttling of the cores, may be based on the historical record of power usage of the same type of thread.

In a further embodiment of the present invention, software hints may be used regarding priority of threads. Software hints may include information about the software threads, e.g., their priority or their inherent tendency to heat up the core. Such software hints may be provided to the CPU, for example, from an operating system running on a device associated with the CPU. Any item of information about the software thread may be used as a software hint. It should be noted that any of the above methods or any combination of the above methods and/or any other suitable methods to determine the throttle heuristics may be used in conjunction with embodiments of the present invention.

It should be noted that block 200 is optional. In other embodiments of the present invention, block 200 may be omitted and the processor itself may extract priority or other information about the thread being processed by other means such as, for example, activity factors, or the processor may use the thermal data itself as a heuristic aid. According to embodiments of the present invention, other heuristic aids may be used to decide throttling. Thus, for example, upon determining which core to throttle, feedback data may be sent to the processor, which may then be used, alone or cumulatively, e.g., together with other data, to decide the priority of threads.

As indicated at block 202, inputs may be received relating to the thermal status of the cores. These inputs may include, for example, the temperature at a core or a parameter responsive to the temperature at the core, or another measurement that may relate to processing activity or another measured property that may relate to a thermal condition. Such a related property may be provided, for example, by an event counter that measures the recurrence of events correlated with heating, and may provide a signal responsive to the rate of recurrence of such events.

In one embodiment of the present invention, a sensor responsive to a thermal parameter, such as for example thermal sensor 104 or 106 depicted in FIG. 1, for sensing temperature to detect high power conditions may be used as a power monitor. The sensor output may be fed-back to RMU 108 to monitor the status of the core power, if desired. As indicated at block 204, the RMU may determine whether a thermal parameter threshold has been reached. The thermal parameter threshold may for example be pre-determined. If the threshold has been reached, a thermal correction process may be initiated, if desired. In the embodiment shown in FIG. 2, at block 206, one or more threads with lower priority may be throttled to cool the CPU, while leaving higher priority threads undisturbed. It should be noted that, in some embodiments, the thermal collection process initiated by the RMU may include using one or any combination of techniques to control operation, or lower performance, of at least one thread during operation, thereby to cool the CPU. For example, a throttling mechanism may be activated to reduce operation on certain resources, for example, resources that are identified as running non-critical or low-activity threads.

Controlling operation of a resource may, for example, include throttling a resource. Throttling may take the form of halting processing at a certain core, or slowing the processing frequency at that core. Throttling may also be an architectural technique that is designed to reduce the thermal condition at a core, for example, eliminating speculative execution, inserting bubbles into the CPU execution pipeline, or other techniques. The throttling mechanism may, for example, be operated according to a pre-defined algorithm. For example, if the thermal condition at a first core is reached, a throttling mechanism may operate according to a distributed algorithm that throttles another core first, then if the thermal condition persists, the throttling mechanism may throttle the first core. It should be noted that one or any combination of thermal correction mechanisms may be used in an embodiment of the present invention.

Figure 3:
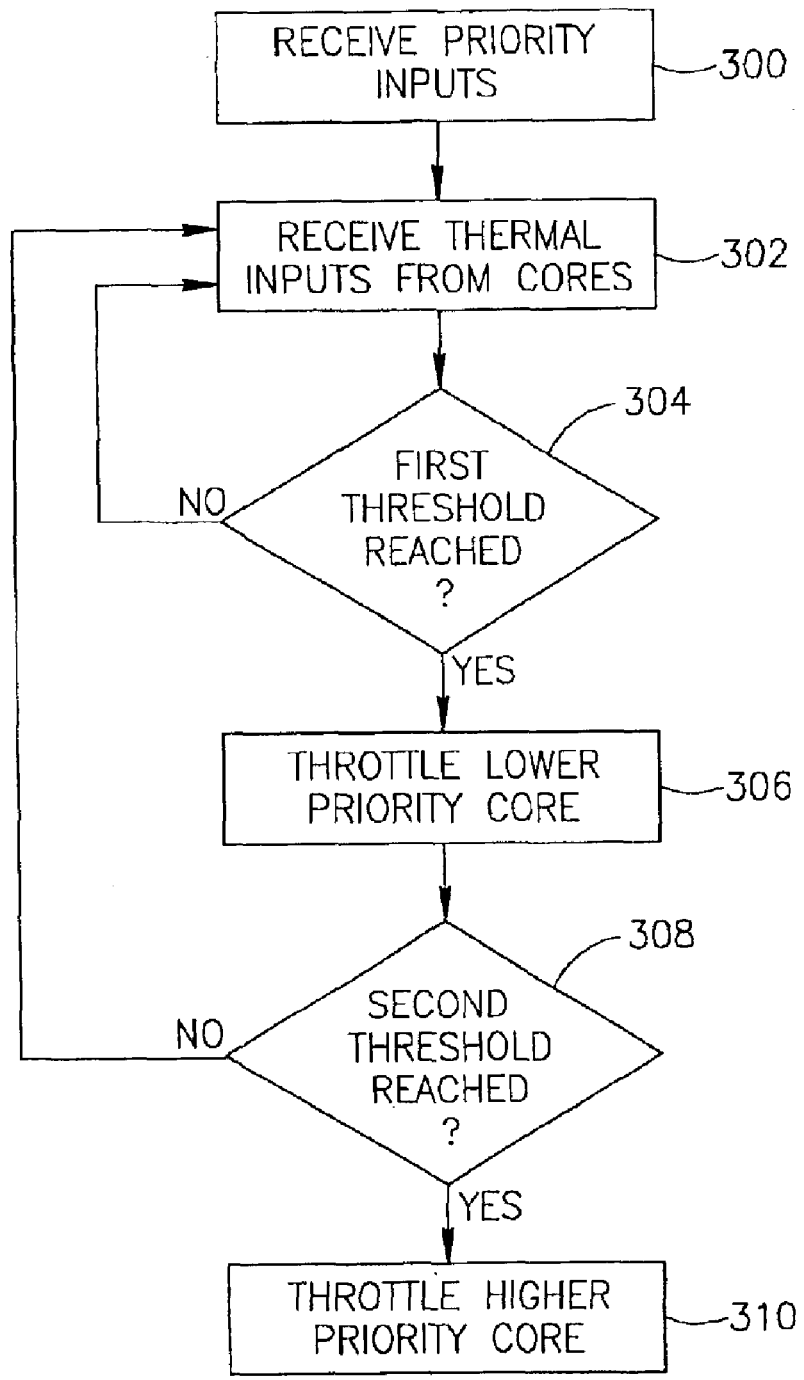
FIG. 3 is a flowchart of a method of thermally relieving a multi-core CPU using thread-execution control in accordance with another exemplary embodiment of the present invention.

In exemplary embodiments of another aspect of the present invention, shown in FIG. 3, there may be two or more thermal threshold levels. In other embodiments of the present invention, the thermal threshold levels may be a continuum, rather than discrete thresholds. As indicated at block 300, inputs may be received relating to the priority of threads being processed at multiple cores. It should be noted that, as explained above with reference to block 200 in FIG. 2, block 300 is optional. As indicated at block 302, inputs may be received relating to the thermal status of the cores. As indicated at block 304, a determination is made whether a first thermal parameter threshold has been reached. If so, as indicated at block 306, a thermal correction process may be initiated for one or more lower priority cores, while leaving higher priority threads undisturbed. It should be noted that, as explained above with reference to block 206 in FIG. 2, in some embodiments, the thermal correction process may include using one or any combination of techniques to lower performance of at least one thread during operation. As indicated at block 308, a determination is then made whether a second thermal parameter threshold has been reached. If the second threshold has been reached, as indicated at block 310, a thermal correction process may be initiated for one or more higher priority cores. As explained above with reference to block 206 of FIG. 2, in some embodiments of the invention, block 310 may provide feedback data to the processor, which may then be used, alone or cumulatively with other data, to decide the throttle heuristics.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It is, therefore, to be understood that the appended claims are intended to cover all such variations, modifications and changes and other applications as fall within the true spirit of the invention.

What is claimed is:

1. A method comprising controlling the operation of at least one of first and second resources, which are configured to execute first and second respective threads of a processing application, based on a thermal-related parameter of said first resource and said second resource.

2. The method of claim 1, wherein controlling the operation comprises throttling at least one of said first and second resources.

3. The method of claim 2, wherein controlling the operation comprises throttling said first resource if said thermal-related parameter of said second resource is greater than a threshold.

4. The method of claim 1, further comprising monitoring said thermal-related parameter of said first resource and said second resource.

5. The method of claim 2, further comprising:
throttling said second resource if said thermal-related parameter of said first resource is greater than, a first threshold; and
throttling said first resource if said thermal-related parameter of said first resource is greater than a second threshold.

6. The method of claim 1, wherein controlling the operation comprises controlling the operation of at least one of said first and second resources based on a priority-related parameter of said first thread being executed on said first resource and said second tread being executed on said second resource.

7. The method of claim 6, further comprising receiving from an operating system said priority-related parameter of said first thread being executed on said first resource and said second thread being executed on said second resource.

8. The method of claim 6, further comprising calculating said priority-related parameter of said first thread being executed on said first resource and said second thread being executed on said second resource.

9. The method of claim 1, wherein said thermal-related parameter of said first resource is responsive to the temperature of said first resource and said thermal-related parameter of said second resource is responsive to the temperature of said second resource.

10. The method of claim 1, wherein said thermal-related parameter of said first resource is represented by a signal related to temperature of said first resource and said thermal-related parameter of said second resource is represented by a signal related to temperature of said second resource.

11. The method of claim 1, wherein said thermal-related parameter of said first resources is a count of events at said first resource and said thermal-related parameter of said second resources is a count of events at said second resource.

12. An article comprising a storage medium containing instructions that, when executed by a processing element, result in:
controlling the operation of at least one of first and second resources, which are configured to execute first and second respective threads of a processing application, based on a thermal-related parameter of said first resource and said second resource.

13. The article of claim 12, wherein the instructions that result in controlling the operation, when executed, further result in:
throttling at least one of said first and second resources.

14. The article of claim 13, wherein the instructions that result in controlling the operation, when executed, further result in:
throttling said second resource if said thermal-related parameter of said first resource is greater than a first threshold; and
throttling said first resource if said thermal-related parameter of said first resource is greater than a second threshold.

15. The article of claim 12, wherein the instructions that result in controlling the operation, when executed, further result in:
monitoring said thermal-related parameter of said first resource and said second resource.

16. The article of claim 15, wherein the instructions that result in controlling the operation, when executed, further result in:
throttling said first resource if said thermal-related parameter of said first resource is greater than a threshold.

17. The article of claim 15, wherein the instructions that result in controlling the operation, when executed, further result in:
throttling said first resource if said thermal-related parameter of said second resource is greater than a threshold.

18. An apparatus comprising:
a resource management unit to receive at least two inputs responsive to a thermal-related parameter of first and second, respective, resources of a processing unit having at least two resources and, based on said inputs, to control the operation of at least one of said first and second resources, wherein said first and second resources are configured to execute first and second threads, respectively, of a processing application.

19. The apparatus of claim 18, further comprising at least first and second thermal-related parameter sensors to monitor said thermal-related parameter at each of said first and second resources, respectively.

20. The apparatus of claim 19, wherein each of said first and second thermal-related parameter sensors comprise power monitors.

21. A digital computer comprising:
a resource management unit to receive at least two inputs responsive to a thermal-related parameter of first and second, respective, resources of a processing unit having at least two resources and, based on said inputs, to control the operation of at least one of said first and second resources, wherein said first and second resources are configured to execute first and second threads, respectively, of a processing application; and
a memory able to communicate with said resource management unit.

22. The digital computer of claim 21, wherein said first and second resources comprise first and second processors of a central processing unit of said digital computer, respectively.

23. The digital computer of claim 22, further comprising said central processing unit.

24. The digital computer of claim 23, wherein said memory is able to communicate with said central processing unit.

* * * * *